US006963657B1

(12) United States Patent
Nishigaki et al.

(10) Patent No.: US 6,963,657 B1
(45) Date of Patent: Nov. 8, 2005

(54) OBJECT RECOGNITION SYSTEM

(75) Inventors: Morimichi Nishigaki, Wako (JP); Tomoyoshi Aoki, Wako (JP); Masakazu Saka, Wako (JP); Hiromitsu Yuhara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 704 days.

(21) Appl. No.: 09/640,928

(22) Filed: Aug. 17, 2000

(30) Foreign Application Priority Data

Sep. 24, 1999 (JP) ................................. 11-269627

(51) Int. Cl.[7] ........................... G06K 9/00; G08G 1/00; G08G 1/16; G01C 22/00; G01C 3/00; G05D 1/00
(52) U.S. Cl. ...................... 382/106; 382/103; 382/104; 382/107; 382/108; 701/23; 356/3; 340/901; 340/903
(58) Field of Search ............................... 382/103–104, 382/106–108; 356/3; 348/169, 118; 318/580, 318/587; 701/23, 28; 340/901, 903

(56) References Cited

U.S. PATENT DOCUMENTS

| 4,722,547 A | * | 2/1988 | Kishi et al. .................... 367/96 |
| 4,924,153 A | * | 5/1990 | Toru et al. .................... 318/587 |
| 5,026,153 A | * | 6/1991 | Suzuki et al. .............. 356/3.16 |
| 5,214,408 A | * | 5/1993 | Asayama .................... 340/435 |
| 5,223,907 A | * | 6/1993 | Asayama .................... 356/3.14 |
| 5,253,050 A | * | 10/1993 | Karasudani ................. 348/118 |
| 5,359,666 A | * | 10/1994 | Nakayama et al. ......... 382/104 |
| 5,638,116 A | * | 6/1997 | Shimoura et al. ........... 348/118 |
| 5,969,969 A | * | 10/1999 | Ejiri et al. .................... 701/41 |
| 6,041,274 A | * | 3/2000 | Onishi et al. ................. 701/26 |
| 6,487,303 B1 | * | 11/2002 | Yamaguchi et al. ........ 382/103 |

FOREIGN PATENT DOCUMENTS

| JP | 7-225126 | 8/1995 |
| JP | 08-210848 | * 8/1996 |

OTHER PUBLICATIONS

Weber et al., "An integrated stereo-based approach to automatic vehicle guidance" 1995, IEEE, 1-36.*
Gerrish, et al., "Image Processing for Path-Finding in Agricultural Field Operations," ASAE Paper No. 85-3037, Jun. 23-26, 1985.*

* cited by examiner

Primary Examiner—Bhavesh M. Mehta
Assistant Examiner—Shefali Patel
(74) Attorney, Agent, or Firm—Lahive & Cockfield, LLP; Anthony A. Laurentano, Esq.

(57) ABSTRACT

An object recognition system mounted on a vehicle comprises a camera and a controller. The camera captures an image in front of the vehicle. The controller divides the image into a plurality of windows. The controller measures distance to the road surface for each of the plurality of windows and thereby obtains a plurality of distances. The controller estimates a relative inclination of the road surface against the vehicle based on the plurality of distances. The controller judges, for each of the plurality of windows, based on the estimated inclination, whether the object is an obstacle or the road surface and thereby obtains a judgment result. The controller recognizes the object based on the judgment result. The system recognizes objects in front of the vehicle even when the vehicle is lopsided by pitching, rolling or else.

36 Claims, 7 Drawing Sheets

(a)

(b)

OBJECT RECOGNITION SYSTEM

FIELD OF THE INVENTION

The present invention relates to an optical object recognition system which detects objects in front of a vehicle such as an automobile, etc., using one or more sensors mounted on this vehicle. More specifically, the present invention concerns an object recognition system which recognizes objects using a plurality of windows in the captured images.

BACKGROUND OF THE INVENTION

In recent years, devices which determine the distance and the size of objects in front of a vehicle, and which appropriately control the vehicle in accordance with this determination, have been proposed for the purpose of improving the safety of vehicle operation.

Japanese Patent Application Kokai No. Hei 7-225126 describes one example of a device for recognizing objects in front of a car appropriately. The device utilizes an optical distance measuring device consisting of two light-receiving elements, and determines whether an object whose distance has been detected is a physical object (an obstacle) or a road area (including characters or white lines on the road surface). Specifically, the device comprises a stereo camera capturing an image of an object on the road, divides the image into a plurality of windows, and calculates the distance between the stereo camera and the captured object for each window. The object in front of a car is recognized by comparing the distance with a reference distance determined for each row range of the windows.

The device disclosed in Japanese Patent Application Kokai No. Hei 7-225126 decides whether the object is a physical object or a road area based on an assumption that the road spreads horizontally ahead of the vehicle. Difference may exist between the actual road and the road estimated based on the assumption when factors such as an attachment position of the camera or an installation angle have deviated from the predetermined specification. This makes it difficult to judge whether a measured value truly represents the distance to the road and may lead to a false recognition of the object. Specifically, difference may occur in such occasions as when the vehicle is lopsided by pitching or rolling, when a vehicle travels along a hill, or when the attachment point or the installation angle of the camera has changes from the location as initially specified.

SUMMARY OF THE INVENTION

Accordingly, one object of the present invention is to provide a system, which recognizes objects in front of a vehicle even when the vehicle is lopsided by pitching or rolling or when it is traveling up or down hill, or the camera has moved from a specified point or a specified angle.

In according with one aspect of the invention, an object recognition system, mounted on a vehicle comprises an image sensor and a controller. The sensor captures an image of an object. The controller divides the image into a plurality of windows. The controller measures a distance to the road surface for each of the plurality of windows and thereby obtains a plurality of distances. The controller estimates a relative inclination of the road surface against the vehicle based on the plurality of distances. The controller judges, for each of the plurality of windows, based on the estimated inclination, whether the object is an obstacle or the road surface and thereby obtains a judgment result. The controller recognizes the object based on the judgment result.

In accordance with another aspect of the invention, an object recognition method for recognizing an object ahead of a vehicle comprises the steps of capturing an image in front of the vehicle, measuring a distance to the road surface for each of a plurality of windows dividing the image, estimating a relative inclination of the road surface against the vehicle based on the plurality of distances, judging based on the estimated inclination whether the object is an obstacle or the road surface for each of the windows, and recognizing the object based on such judgment.

In accordance with further another aspect of the invention, an object recognition system comprises one or more sensors for capturing an image of an object, measuring means for measuring a distance to the road surface for each of a plurality of windows dividing the image and thereby obtains a plurality of distances, estimation means for estimating a relative inclination of the road surface against the vehicle based on the plurality of distances, judging means for judging based on the estimated installation angle whether the object is an obstacle or the road surface for each of the plurality of windows, and recognition means for recognizing the object based on a result from the judging means.

According to an aspect of the invention, an estimation of a relative inclination between a vehicle and a road surface is possible even when the vehicle is lopsided by pitching (tilt in a front-to-rear direction due to acceleration or deceleration) or rolling (tilt in a side-to-side direction at a curve), or when the vehicle travels along a hill or a road with banks. The estimated inclination allows judgment whether the object is an obstacle, or a character or a sign on the road, thus enabling an appropriate recognition of the object.

According to another aspect of the invention, an object recognition system mounted on a vehicle comprises one ore more image sensors for capturing an image of an object, measuring means for measuring distance to a road surface for each of a plurality of windows dividing the image, estimation means for estimating a relative inclination of the road surface against the vehicle based on the measured distances, correction means for correcting position of the image sensor based on the estimated inclination, judging means for judging based on the corrected position of the image sensor whether the object is an obstacle or a road surface for each of the windows, and recognition means for recognizing the object based on judgment result from the judging means.

In accordance with such an aspect of the invention, an object can be properly recognized even when positioning error of the image sensor has accumulated due to secular changes over a long period of time. The positioning error of the image sensor, typically a camera, may be estimated and corrected based on measurement of the distance to the road surface.

BRIEF DESCRIPTION OF THE DRAWINGS

FIG. 4(a) is showing an actual road, an estimated road and the deleted ranges of the road, and FIG. 4(b) shows the content of the three-dimensional road memory plotted on the z-y plane.

FIG. 5(a) is showing an actual road, an estimated road and deleted ranges of the road, and FIG. 5(b) shows the content of the three-dimensional road memory plotted on the x-y plane.

DETAILED DESCRIPTION OF THE INVENTION

Figure 1:
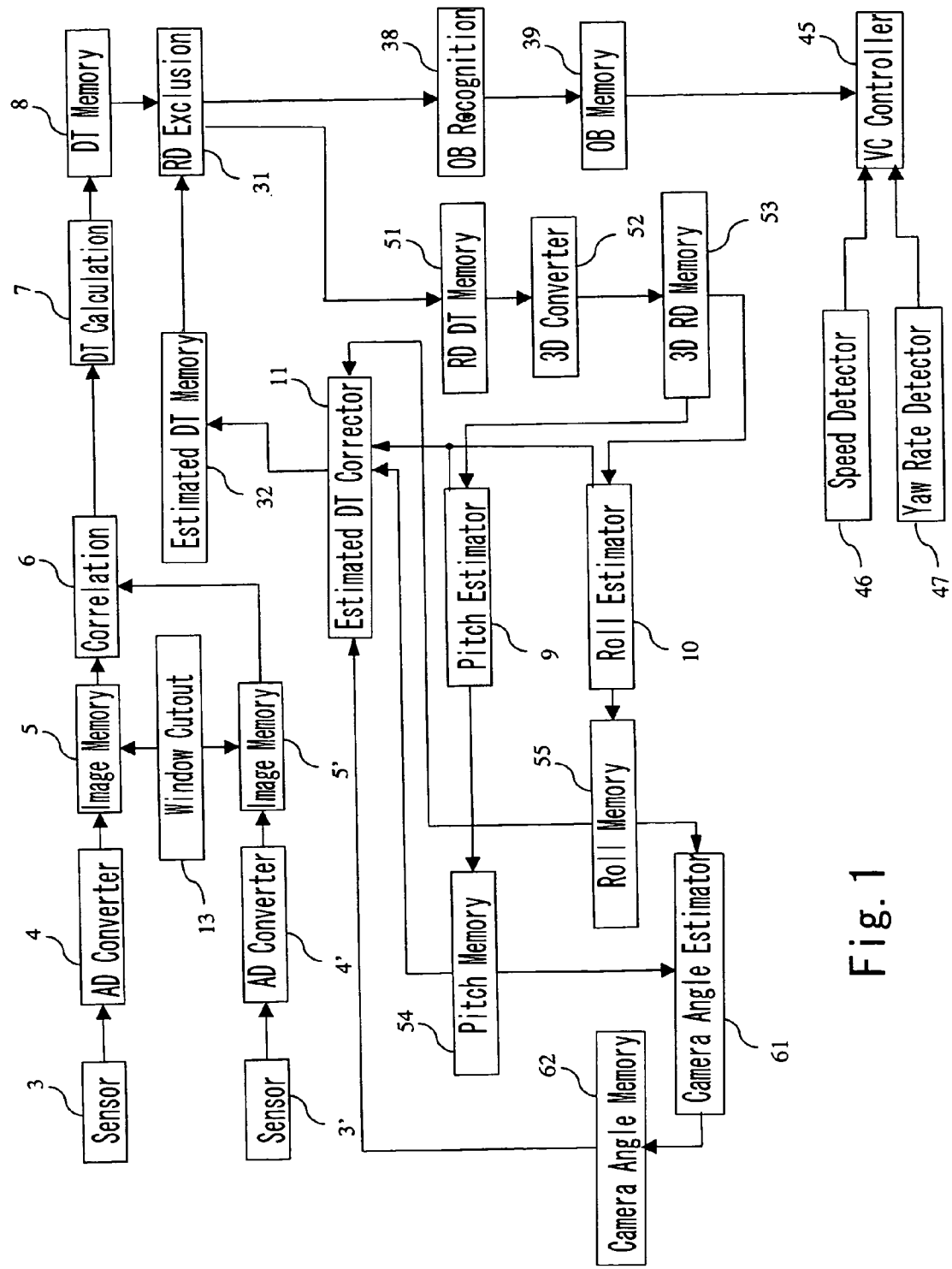
FIG. 1 is a block diagram illustrating an overall structure of one embodiment of the present invention.
Figure 2:
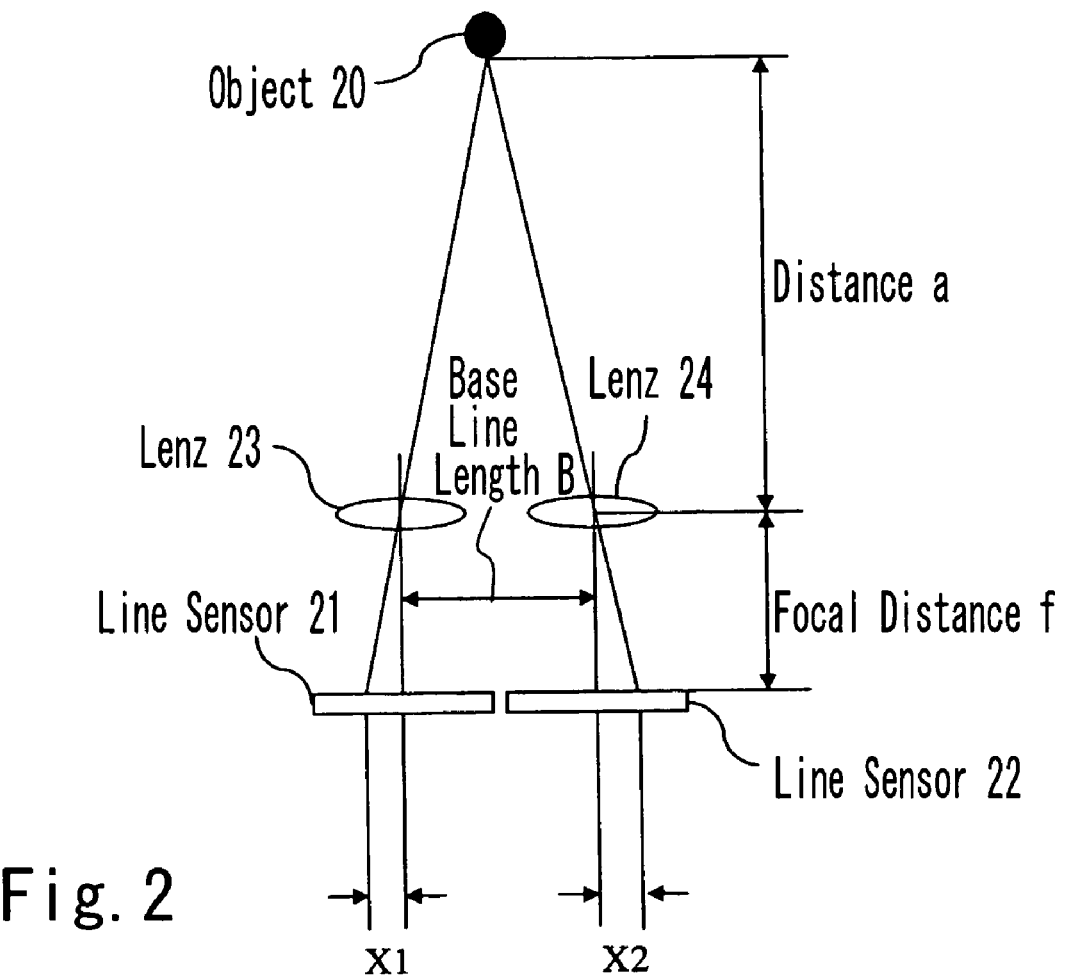
FIG. 2 is a diagram illustrating the principle of measurement by a triangulation method.

The invention will now be described relative to a preferred embodiment referring to the attached drawings. FIG. 1 is an overall block diagram of an object recognition system in accordance with one embodiment of the present invention. FIG. 2 is a diagram which indicates the distance measurement principle based on the triangulation method used in the present embodiment. First, a distance measurement method using a pair of image sensors will be described with reference to FIG. 2.

A line sensor 21 and lens 23 constituting one of a pair of image sensors in a stereo camera are installed at a specified distance, i.e., at a distance equal to the base line length B in the horizontal or vertical direction from the line sensor 22 and lens 24 constituting the other of a pair of image sensors. The line sensors 21 and 22 are typically one-dimensional CCDs, but may also be linearly arranged photo-sensor arrays. For the use at night, image sensors using infrared light are advisable. In this case, it is advisable to install infrared-transparent filters in front of the lenses 23 and 24, and to devise the system so that an object 20 is illuminated at predetermined time intervals using an infrared light source. Infrared light reflected from the object 20 is sensed by the line sensors 21 and 22.

The line sensors 21 and 22 are respectively positioned at the focal length "f" of the lenses 23 and 24. Assuming that an image of an object located at distance "a" from the plane of the lenses 23 and 24 is formed at a position shifted by a distance X1 from the optical axis of the lens 23 in the case of the line sensor 21, and is formed at a position shifted by a distance X2 from the optical axis of the lens 24 in the case of the line sensor 22, then, according to the principle of triangulation, the distance "a" to the object 20 from the plane of the lenses 23 and 24 is determined by the equation: a=B·f/(X1+X2).

In the present embodiment, the images are digitized. And accordingly, the distance (X1+X2) is digitally calculated. The sum of the absolute values of the differences between the digital values indicating the brightness of the corresponding pixels of both images obtained from the line sensors 21 and 22 is determined while one or both of the images are shifted, and this sum is taken as a correlation value. The amount of shift of the images when this correlation value is at a minimum indicates the positional deviation between the two images, i.e., (X1+X2). In idealized terms, the distance by which the two images obtained from the line sensors 21 and 22 must be moved in order to cause the images to overlap as shown in FIG. 2 is (X1+X2).

Here, for the sake of simplicity, the image sensors were described as one-dimensional line sensors 21 and 22. However, in one embodiment of the present invention, as will be described below, two-dimensional CCDs or two-dimensional photo-sensor arrays are used as image sensors. In this case, the same correlation calculations as those described above are performed by relatively shifting the two-dimensional images obtained from the two image sensors. The amount of shift at the point where the correlation value reaches a minimum corresponds to (X1+X2).

Figure 3:
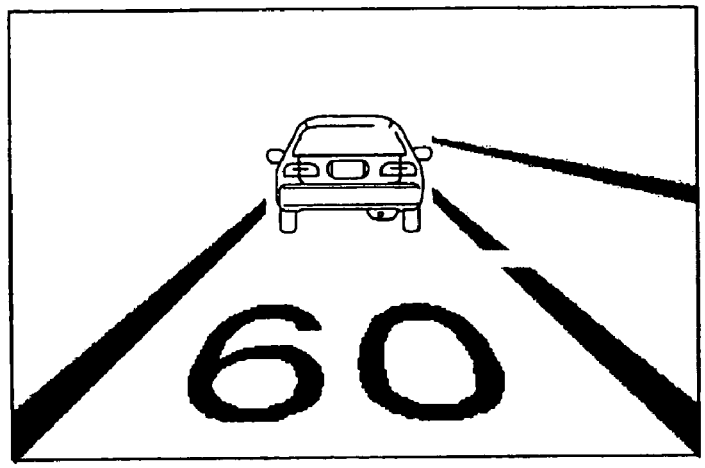
FIG. 3(*a*) is a diagram showing an image that is captured, and FIG. 3(*b*) shows the image divided into small areas (windows) for the purpose of judging distances and road areas, in accordance with one embodiment of the present invention.
Figure 3:
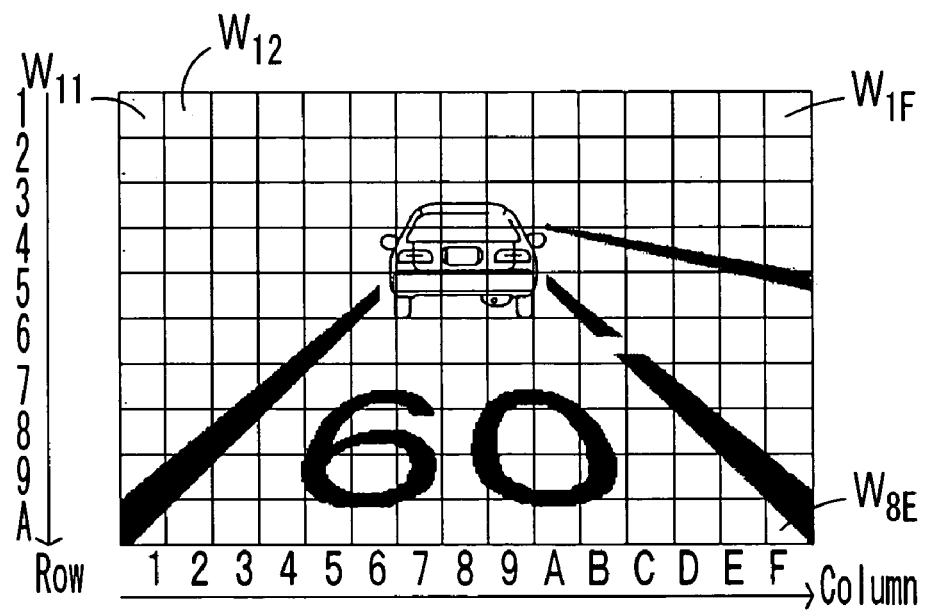

The image sensor 3 shown in FIG. 1 corresponds to one of the image sensors in FIG. 2, comprising the lens 23 and line sensor 21, and the image sensor 3' corresponds to the other image sensor in FIG. 2, comprising the lens 24 and line sensor 22. In this embodiment, as is shown in FIG. 3(b), the imaged area is divided into a plurality of windows (small sections) $W_{11}$, $W_{12}$, and distance is measured for each window. Accordingly, a two-dimensional image of the overall object is required. Accordingly, each of the image sensors 3 and 3' is comprised of a two-dimensional CCD array or a two-dimensional photo-sensor array.

FIG. 3(a) shows an example of the image obtained when another vehicle running in front of the vehicle incorporating the system of the present invention is imaged by one of the image sensors 3 and 3'. FIG. 3(b) shows the image in FIG. 3(a) schematically split into a plurality of small sections called windows. FIG. 3(b) has rows in the vertical direction and columns in horizontal direction. For the sake of simplicity, the image is shown split into 10 rows×15 columns of windows. Reference numerals are assigned to the respective windows. For example, $W_{12}$ indicates the window in row 1, column 2.

Referring to FIG. 1, the images of objects captured by the image sensors 3 and 3' are converted into digital data by analog-digital converters (A/D converters) 4 and 4' and stored in image memories 5 and 5'. The image portions corresponding to the window $W_{11}$ are respectively cut out from the image memories 5 and 5' by a window cutout part 13 and sent to a correlation calculating part 6. The correlation calculating part 6 shifts the two cutout images by a specified unit at a time, and performs the aforementioned correlation calculations. The amount of shift at the point where the correlation value reaches a minimum corresponds to (X1+X2). The correlation calculating part 6 sends the value of (X1+X2) thus determined to a distance (DT) calculating part 7.

The distance calculating part 7 determines the distance $a_{11}$, to the object in the window $W_{11}$ using the aforementioned formula: a=B·f/(X1+X2). The distance $a_{11}$, thus determined is stored in a distance memory 8. A similar calculation process is successively performed for respective windows, and the resulting distances $a_{11}$, $a_{12}$, . . . are stored in the distance memory 8. The distance to a captured object calculated for each window is referred to as the "measured distance" of the window.

In the image data used in the above-mentioned correlation calculations, the pitch of the elements in the imaging element array determines the resolution. Accordingly, when a light-receiving element such as a photo-sensor array that has a relatively large pitch is used, it is preferred to enhance the density of the image data by performing calculations involving inter-pitch interpolation. Correlation calculations can be performed for image data whose density has thus been enhanced. Moreover, the windows are allowed to overlap one another.

An estimated distance memory 32 stores distances to the road estimated for respective windows (referred to as "estimated distances" hereinafter). A road (RD) surface exclusion part 31 excludes windows that merely show road surface. Such windows showing road surface are identified and deleted by a scheme described in U.S. patent application Ser. No. 09/534,349 filed on Mar. 24, 2000, which is incorporated herein by reference. Briefly, the system compares the measured distance of each window with estimated distance of the corresponding window. Measured distances of the windows each having a measured distance that is close to the estimated distance, that is, the windows each having a measured distance that is approximately the same as the distance to the road are stored in a road surface distance memory 51 with respect to each window and are deleted from the distance memory 8.

Likewise, measured distances of the windows each having a measured distance equal to or more than the corresponding estimated distance, that is, the windows each having a measured distance that is larger than the distance to the road are stored in the road surface distance memory 51 with respect to each window and are deleted from the distance memory 8 by the road surface exclusion part 31. Thus, characters and white lines on the road surface are transferred from the distance memory 8 to the road surface distance memory 51 and are deleted from the memory 8.

The estimated distances are changed dynamically according to the process described later. Their initial values are set to the values calculated under the conditions that the vehicle is positioned parallel to a horizontal road surface without being lopsided. Such values may be calculated from the attachment position of the CCD cameras, the installation angle, the base line length B, the focal distance f, the size of the CCD and the positions of the windows in the image. The estimated distance memory 32 stores the initial values for respective windows.

In the above example, the measured distance values of windows that have been determined to belong to the road surface are deleted from the distance memory 8. Alternatively, flags may be set for such windows identifying that the windows belong to the road surface. Such windows with flags may be stored in the distance memory 8 thus omitting the road surface distance memory 51.

A three-dimension converter 52 converts the positions of windows and the corresponding measured distance values into coordinates in a three-dimensional space, with the origin point being the attachment position of the camera, the y-axis being vertical downward direction, the z-axis being the direction of the vehicle's straight travel, and the x-axis being perpendicular to both the y and z axes. The x-axis represents the width direction of the vehicle. The converted coordinates are stored in a three-dimensional road surface memory 53.

An object recognition system utilizing three-dimensional conversion of the image is described in U.S. patent application Ser. No. 09/572,249 filed on May 17, 2000, which is incorporated herein by reference.

A road surface pitch estimator 9 estimates relative inclination between the camera and the road surface from the three-dimensional positions stored in the road surface memory 53 in the case of tilt in the front-to-rear direction due to pitching (drop in the rear or the front of the vehicle in acceleration or deceleration) or a travel along a hill.

Figure 4:
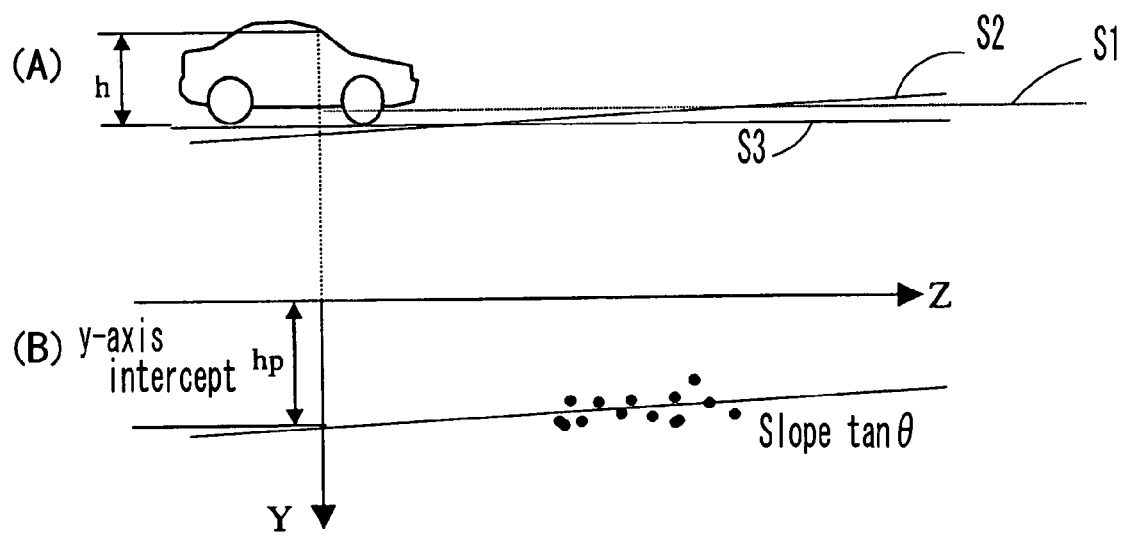
FIG. 4(a) and FIG. 4(b) are diagrams in the case of pitching.

FIGS. 4(A) and 4(B) show the correlation between an estimated road surface S3 and an actual road surface S2 in the case of front-dropping pitching. The actual road surface S2 represents the relative road surface on the assumption that the vehicle is positioned horizontally. In that case, the relative road surface appears as an uphill slope.

In FIG. 4(A), a line S1 represents a virtual road surface that is positioned above the estimated road surface S3 by a predetermined distance such as 10 cm. The window whose measured distance value are below the surface S1 is regarded as capturing the road surface and its position and the distance value are stored in the road surface distance memory 51 by the road surface exclusion part 31. Those position and distance are converted through the three-dimensional converter 52 into a three-dimensional position and stored in the three-dimension road surface memory 53.

FIG. 4(B) shows the three-dimensional position stored in the memory 53, projected onto the z-y plane. The road surface pitch estimator 9 samples those positions in the memory 53 whose respective z-coordinate values are equal to or lower than a predetermined value, for example, 15 m. If the number of the samples is equal to or larger than a predetermined value, for example, 200, equations (1) to be described hereafter is used to determine a straight line representing best the correlation of the samples projected onto the z-y plane. The inclination, the y-intercept and the number of the samples of the straight line are stored in a road surface pitch memory 54. On the other hand, the number of the samples less than 200 leads to reservation of the content of the memory 54 without its content being updated. The inclination of the straight line represents the inclination of the road surface in the front-rear direction in FIG. 4(A) and the y-axis intercept represents the height of the camera from the road surface.

$$\tan\theta = \frac{n\sum ZiYi - \sum Zi \sum Yi}{n\sum Zi^2 - (\sum Zi)^2} \quad (1)$$

$$h_P = \frac{\sum Yi - \tan\theta \sum Zi}{n}$$

"Yi" and "Zi" respectively represent the y and z coordinates of the i-th sample position, "n" the number of the samples, "tan θ" the slope of the straight line and "hp" the y-axis intercept.

A road surface roll estimator 10 estimates a relative inclination of the road surface compared with the camera. The estimation is performed utilizing the three-dimensional position stored in the memory 53 in the case of tilt of the vehicle in the side-to-side direction due to rolling (drop in left-side or right-side of the vehicle in the motion of cornering), running a road with a bank thereon, or else.

Figure 5:
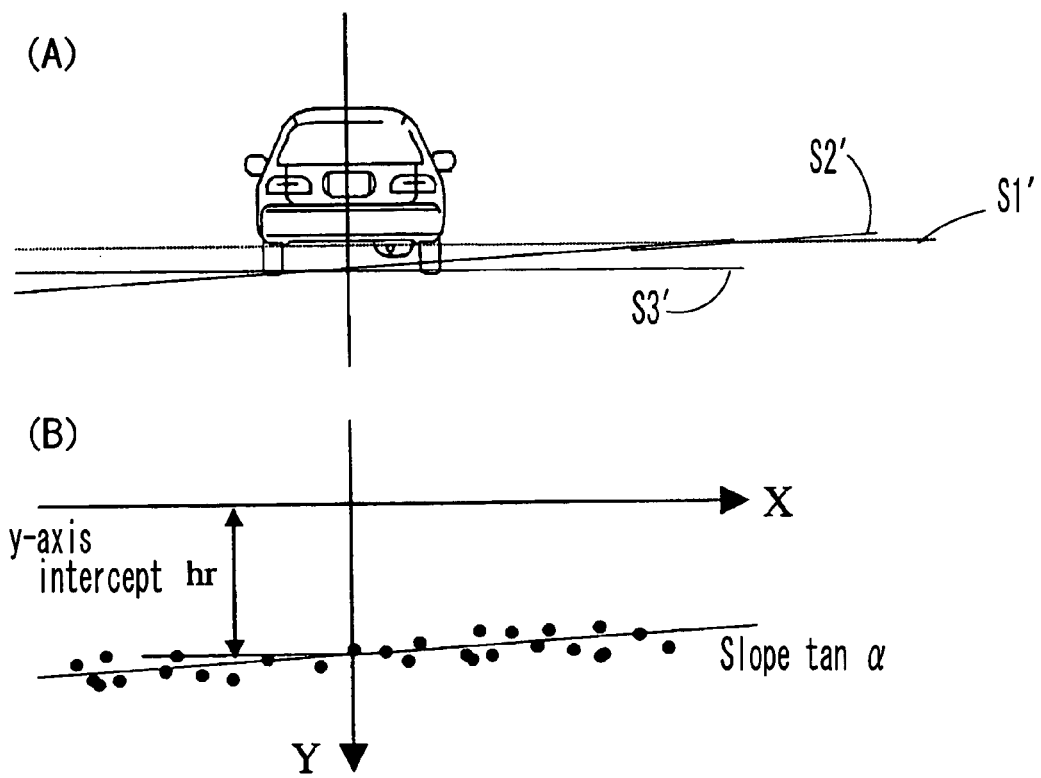
FIG. 5(a) and FIG. 5(b) are diagrams in the case of rolling.

FIGS. 5(A) and 5(B) show the correlation between an estimated road surface S3' and an actual road surface S2' in the case of right-side-drop rolling. The actual road surface S2' represents the relative road surface on the assumption that the vehicle is horizontally positioned. In that case, the relative road surface appears as a right-side-up slope.

In FIG. 5(A), a dotted line S1' represents a virtual road surface that is positioned above the estimated road surface S3' by a predetermined distance, for example, 10 cm. The window whose measured distance value is lower than the imaginary surface S1' is regarded as capturing the road surface, and its position and the distance value are stored in the road surface distance memory 51 by the road surface exclusion part 31. Those position and distance are converted through the three-dimensional converter 52 into a three-dimensional position and stored in the three-dimension surface memory 53.

FIG. 5(B) shows the three-dimensional position stored in the memory 53, projected onto the x-y plane. The road surface roll estimator 10 samples those positions in the memory 53 whose respective z-coordinate values are equal to or lower than a predetermined value, for example, 15 m. When the number of the samples is equal to or more than a predetermined value, for example, 200, equations (2) to be described hereafter is used to determine a straight line best representing the correlation of the samples projected onto the x-y plane. The slope, the intercept of the y-axis and the number of the samples of the straight line are stored in a road surface roll memory 55. On the other hand, when the number of the samples is less than 200, the content of the memory 55 is reserved without being updated. The slope of the straight line represents the slope in the side-to-side direction of FIG. 4(A), and the y-axis intercept represents the height of the camera from the road surface.

$$\tan \alpha = \frac{n \sum XiYi - \sum Xi \sum Yi}{n \sum Xi^2 - (\sum Xi)^2} \quad (2)$$

$$h_r = \frac{\sum Yi - \tan \alpha \sum Xi}{n}$$

"Xi" and "Yi" respectively represent the x and y coordinates of the i-th sample position, "n" the number of the samples, "tan α" the slope of the straight line and "hr" the y-axis intercept.

The estimators 9, 10 sample only those positions whose respective z-coordinates are equal to or less than 15 m because the further the distance is, the lower the accuracy of the positions is, and the further the distance is, the larger the discrepancies between the actual road surface and the estimated road surface will grow, which may lead to capturing of other objects than the road surface, which in turn would cause errors in the estimation if added to the samples. Also, the reason for not carrying out slope estimation when the number of the samples is less than 200 is that smaller samples makes estimated values not credible.

An estimated distance corrector 11 corrects stored content of the estimated distance memory 32 according to the respective slopes in the front-to-rear direction and the side-to-side direction and the height of the camera stored in the memory 54 and 55, so that the content represents more appropriate distances to the road surface.

The correlation between the position (x, y) on the plane of the CCD to capture the image of the road surface and the distance to the road surface may be estimated utilizing equations (3) even in the case of pitching, rolling or running a hill slope or a road with banks.

$$h = (hp + hr)/2 \quad (3)$$
$$\varepsilon = x \tan \alpha - y - F \tan \theta$$
$$d = h\sqrt{y^2 + F^2}/\varepsilon \quad (\varepsilon > 0)$$
$$0 \quad (\varepsilon \leq 0),$$

"tan Ø" and "tan α" respectively represent the slopes of the straight lines respectively stored in the memory 54 and 55, and "hp" and "hr" the y-axis intercepts respectively in the memory 54 and 55. Element "h" represents the distance of the CCD camera from the road surface. "F" represents the focal distance of the CCDs. "d=0" implies that windows are not capturing the road surface.

Figure 6:
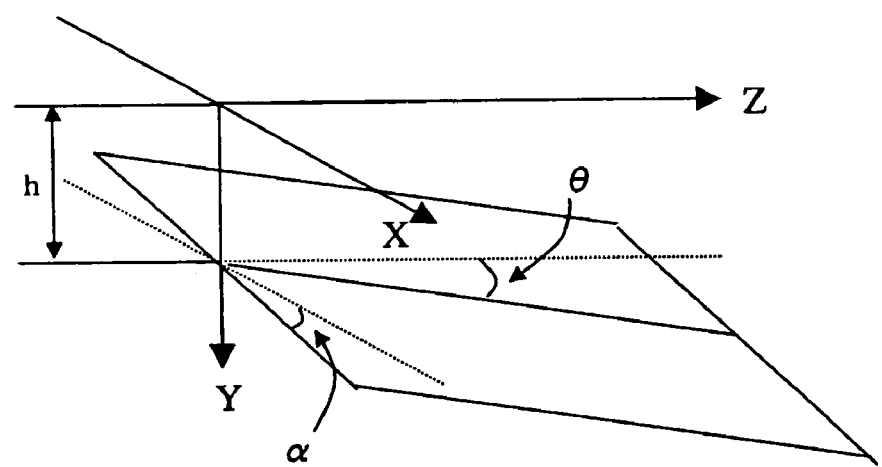
FIG. 6 is a diagram illustrating a road estimated from the content of the road pitch memory and the road roll memory.
Figure 7:
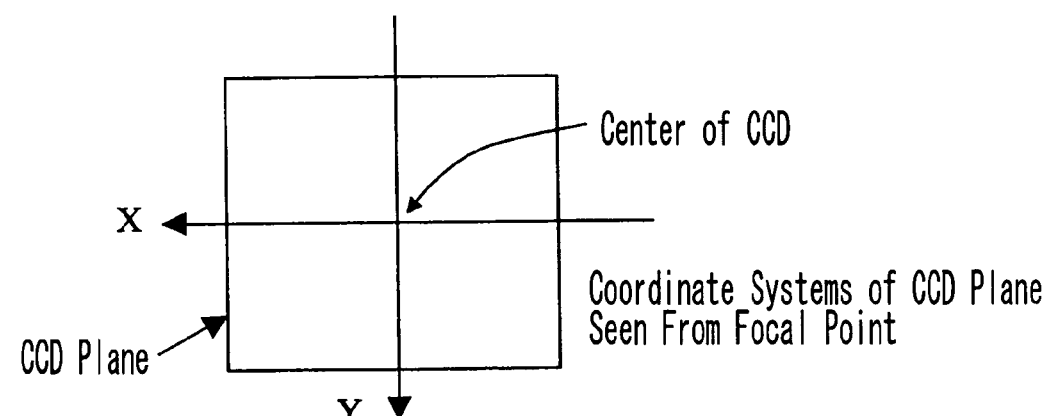
FIG. 7 is a diagram illustrating the coordinate systems related to the equation indicating the correlation between the position on the CCD plane and the distance to the road.

As shown in FIG. 6, the slope and intercept of the line stored in road surface pitch memory 54 and the slope and intercept of the line stored in the road surface roll memory 55 are combined to estimate a single plane. The coordinate system of the CCD is shown in FIG. 7. The correlation between a position in the CCD plane in FIG. 7 onto which the plane in FIG. 6 is projected and a distance from the CCD to this plane in FIG. 6 are as shown in the equations (3).

The estimated distance corrector 11 estimates distances "d"s for respective windows according to the equations (3) to replace previously estimated distances already stored in the memory 32 with the newly estimated distances "d"s.

In the abovementioned example, the content of the memory 32 is replaced directly with distances "d"s, but another scheme may be adopted. For instance, weighed averages between the respective previous distances and the respective current distances are obtained to reduce the variation in estimation due to the measurement error. Moreover, as a further alternative, some sets of previously estimated distances are reserved over some period of time, and the current slope of the road and the current height of the camera may be estimated from the time sequence information.

In accordance with another aspect of the invention, use of a large time constant with which the content of the memory 32 is changed enables the system to learn a secular change in the installation angle or attachment position error of the camera and to correct such change or error. This is due to the fact that, over a long period of time of travel by a vehicle, an average inclination of the road surface is substantially horizontal. Thus, average inclination due to pitch and roll of the vehicle is nearly zero in a long period of time or a large mileage. The average inclination in a long period of time or a large mileage indicates positioning error of the image sensor caused by secular change of physical alignment. Thus, an actual attachment position and an actual angle of the camera can be estimated based on the inclination angles and the heights stored in the memory 54 and 55.

A large time constant here means that the content of the road surface distance memory 32 is updated at an interval of three or six months, or is updated at an interval in terms of mileage, say every 1000 or 2000 miles.

A camera installation angle estimator 61 and a camera installation angle memory 62 may be separately provided. The camera installation angle estimator 61 calculates moving average of the contents in the memory 54 and 55, which have been accumulated over a long period of time, to estimate the average inclination of the road surface and the average height from the road surface to the camera and to store them in the memory 62.

In the above-mentioned example, the number of the samples less than 200 leads to the reservation of the contents in the memory 54 and 55. Instead, the contents of the memory 32 may be varied to approach its initial state. Or, in the case the estimator 61 and the memory 62 are provided, the content in the memory 32 may be operated to approach or reach a distance value estimated based on the height and the angle in the memory 62, whereby discrepancy is avoided between the content in the memory 32 and the actual state of the road surface.

As described above, the estimated distance corrector 11 corrects the estimated distances in the estimated distance memory 32 according to the contents of the road surface pitch memory 54 and the road surface roll memory 55. This correction may be performed, in a hardware structure, in response to a signal from estimator 9 or estimator 10 indicating that the level of change has took place in the content of the pitch memory 54 or the roll memory 55 that requires correction of the estimated distance stored in the memory 32. Or, in a software structure, a central processing unit (CPU) controlling the object recognition system may execute a correction routine at predetermined intervals, for example, 67 ms to correct the estimated distances.

The road surface exclusion part 31 compares the measured distance of each window with corresponding corrected estimated distance in the memory 32. Then a window with a measured distance larger than the corresponding corrected distance minus a predetermined threshold value (e.g. 10 cm) is considered to have captured the road surface. On the other hand, the window with a measured distance equal to or less than the corresponding corrected distance minus the threshold value is considered to have captured a physical object other than the road surface.

Thus, the road surface exclusion part 31 transfers the data of windows that have captured physical objects other than the road surface to the object (OB) recognition part 38. The object recognition part 38 recognizes one or more objects based on the transferred data. The CPU performs the process for object recognition at a predetermined interval, for example, 67 ms. A consolidated recognition based on the results obtained from 2 to 3 cycles of the recognition process will improve recognition accuracy.

An object memory 39 stores information about distance, position, size and the like of the recognized object. The object recognition part 38 calculates the relative speed between the object and the vehicle based on the two pieces of information respectively obtained from the previous and the current recognitions of the same object and then stores the speed in the object memory 39 as a part of current data related to the recognized object.

Reading the object information from the memory 39, a vehicle (VC) controller 45 accordingly executes a collision-prevention action such as sounding an alarm to remind the driver being too close to a vehicle in the front, or executing compulsive braking procedures by sending a signal to an electronic control unit for the engine or a brake control unit. At that time, the vehicle controller 45 receives the vehicle's own speed from an own-speed detector 46 and a yaw rate signal from a yaw rate detector 47 to decide the area to travel, and to keep a safe distance from the object by controlling the vehicle.

The correlation calculating part 6, the distance calculating part 7, distance memory 8, the window cutout part 13, the road surface exclusion part 31, the estimated distance memory 32, the object recognition part 38, the object memory 39, the image memory 5, 5', the road surface distance memory 51, the three-dimension converter 52, the three-dimension road surface memory 53, the road surface pitch estimator 9, the road surface roll estimator 10, the road surface pitch memory 54, the road surface roll memory 55, the camera installation angle estimator 61, the camera installation angle memory 62 and the vehicle controller 45 may be composed of a central processing unit (CPU), a read-only memory storing control programs and control data, and a random access memory (RAM) providing a working area for the CPU and storing various data temporarily. The divided memory areas of a single RAM may be assigned to realize the distance memory 8, the estimated distance memory 32 and the object memory 39. Also, a temporary memory area required for data storage in various operations may be provided utilizing a part of the RAM area.

Moreover, an output from the object recognition system of the invention LAN connected to an electric control unit (ECU) for an engine, an ECU for brake control and additional ECU would be utilized for overall control of the vehicle.

According to the recognition system, as can be seen from the description, correct recognition is performed even when a relative road surface inclination changes due to pitching or rolling, or travel on a hill or a road with a bank. Moreover, positioning error of the sensors due to secular change can be corrected.

What is claimed is:

1. An object recognition system mounted on a vehicle, comprising:
   one or more sensors for capturing an image of a road surface;
   measuring means for dividing the image into a plurality of windows and measuring distance to the road surface for each of the plurality of the windows;
   means for storing, for each of the plurality of the windows, estimated distance to the road surface;
   means for comparing, for each of the plurality of the windows, the measured distance with the estimated distance to determine if the measured distance belongs to the road surface;
   inclination estimation means for estimating a relative inclination of the road surface against the vehicle based on the measured distances that are determined to be of the road surface; and
   means for modifying the estimated distances based on the inclination estimated by said inclination estimation means.

2. The system of claim 1 wherein said inclination estimation means comprises pitch estimating means for estimating slope of pitching of the vehicle as it travels and roll estimating means for estimating slope of roll of the vehicle as it travels.

3. The system of claim 2, further comprising:
   distance estimating means for estimating the distance from each window to the road surface based on the slope of the pitch estimated by the pitch estimating means and the slope of the roll estimated by the roll estimating means; and
   estimated distance memory for storing for each of the windows the distance estimated by said distance estimating means.

4. The system of claim 3 further comprising judging means for comparing the distance measured by said measuring means for each window and the estimated distance estimated by said distance estimating means to determine relative to each window represents the road surface; and
   recognition means for recognizing the object based on a result from the judging means.

5. The system of claim 4 wherein said judging means extracts windows that represent object other than the road surface for transfer to said recognition means.

6. The system of claim 2 wherein said pitch estimating means determines pitch angle Ø according to the equation;

$$\tan\emptyset = \frac{n\Sigma Z_i Y_i - \Sigma Z_i \Sigma Y_i}{n\Sigma Z_i^2 - (\Sigma Z_i)^2}$$

where Yi and Zi are y-axis and z-axis positions respectively of the i-th sample and n indicates the number of samples, y-axis being the direction of height of the vehicle and z-axis being the direction of travel of the vehicle.

7. The system of claim 2, wherein said roll estimating means determines roll angle or α according to the equation;

$$\tan\alpha = \frac{n\Sigma Z i Y i - \Sigma X i \Sigma Y i}{n\Sigma X i^2 - (\Sigma X i)^2} \qquad 5$$

where Xi and Yi are x-axis and y-axis positions respectively of the i-th sample and n indicates the number of samples, x-axis being the direction of breadth of the vehicle and y-axis being the direction of height of the vehicle.

8. An object recognition system mounted on a vehicle, comprising:
one or more sensors for capturing an image of an object;
measuring means for measuring a distance to the road surface for each of a plurality of windows dividing the image;
means for storing, for each of the plurality of the windows, estimated distance to the road surface;
means for comparing, for each of the plurality of the windows, the measured distance with the estimated distance to determine if the measured distance belongs to the road surface;
inclination estimation means for estimating a relative inclination of the road surface against the vehicle based on the plurality of distances that are determined to be of the road surface; and
correction means for correcting positioning error of said one or more sensors based on a long time average of the estimated inclination.

9. The system of claim 8 wherein said inclination estimation means comprises:
pitch estimating means for estimating slope of pitching of the vehicle as it travels; and
roll estimating means for estimating slope of roll of the vehicle as it travels;
wherein said correction means comprises:
distance estimating means for estimating the distance from each window to the road surface based on the slope of pitch estimated by the pitch estimating means and the slope of roll estimated by the roll estimating means;
estimated distance memory for storing for each of the windows the distance estimated by said distance estimating means;
wherein data held by said distance memory is made to change at a large time constant such that secular change of positioning of said one or more sensors is corrected.

10. The system of claim 8 wherein said correction means comprises:
pitch estimating means for estimating slope of pitching of the vehicle as it travels;
roll estimating means for estimating slope of roll of the vehicle as it travels; and
sensor position estimating means for estimating deviation of the position of said one or more sensors from their specified position based on the pitch estimated by said pitch estimating means and the roll estimated by said roll estimating means;
wherein the deviation of the position of said one or more sensors is determined based on moving average of the estimated pitch and the estimated roll.

11. An object recognition method for recognizing an object in front of a vehicle, comprising steps of:
capturing an image in front of the vehicle;
measuring a distance to the road surface for each of a plurality of windows dividing the image and thereby obtaining a plurality of distances;
storing, for each of the plurality of the windows, estimated distance to the road surface;
comparing, for each of the plurality of the windows, the measured distance with the estimated distance to determine if the measured distance belongs to the road surface;
estimating a relative inclination of the road surface against the vehicle based on the measured distances that are determined to be of the road surface; and
modifying the estimated distances based on the estimated relative inclination.

12. The method of claim 11, further comprising a step, performed between the steps of measuring and inclination estimation, of:
extracting windows having captured the road surface from the plurality of windows, and wherein the step of inclination estimation estimates the inclination utilizing distances of the plurality of distances, the utilized distances corresponding to the extracted windows.

13. The method of claim 12, further comprising a step of:
estimating distances to the road surface respectively for the plurality of windows based on the estimated inclination, wherein windows are extracted based on the estimated distances in the step of extraction.

14. The method of claim 11, further comprising the steps of:
judging, for each of the plurality of windows, based on the estimated inclination, whether the object is an obstacle or the road surface and thereby giving a judgment result;
recognizing the object based on the judgment result;
obtaining, when the object has been judged as an obstacle in the judging step, a relative speed and a relative speed and a relative distance between the vehicle and the obstacle utilizing the image;
sensing possible collision with the obstacle based on at least one of the relative speed and the relative distance; and
performing collision avoidance action.

15. An object recognition system mounted on a vehicle, comprising:
a camera for capturing an image of an object; and
a controller configured to perform the functions of;
dividing the image into a plurality of windows;
measuring a distance to the road surface for each of the plurality of windows and thereby obtaining a plurality of distances;
storing, for each of the plurality of the windows, estimated distance to the road surface;
comparing, for each of the plurality of the windows, the measured distance with the estimated distance to determine if the measured distance belongs to the road surface;
estimating a relative inclination of the road surface against the vehicle based on the measured distances that are determined to be of the road surface; and
modifying the estimated distances based on the estimated relative inclination.

16. The system of claim 15, wherein the controller further performs functions of:
extracting windows having captured the road surface from the plurality of windows, and estimating the inclination utilizing distances of the plurality of distances, the utilized distance corresponding to the extracted windows.

17. The system of claim 16 wherein:
the controller further performs functions of;
estimating distances to the road surface respectively for the plurality of windows based on the estimated inclination; and
storing the estimated distances in a memory; and
wherein the function of extracting the windows is based on the estimated distances stored in the memory.

18. The system of claim 15, wherein the controller further performs function of:
judging, for each of the plurality of windows, based on the estimated inclination, whether the object is an obstacle or the road surface and thereby obtaining a judgment result;
recognizing the object based on the judgment result;
calculating, when the object has been judged as an obstacle, a relative speed and a relative distance between the vehicle and the obstacle utilizing the image; and
sensing possible collision with the obstacle based on at least one of the relative speed and the relative distance and performing a collision avoidance action.

19. An object recognition system mounted on a vehicle, comprising:
one or more sensors for capturing an image of a road surface;
measuring means for dividing the image into a plurality of windows and measuring distance to the road surface for each of the plurality of the windows;
means for storing, for each of the plurality of the windows, estimated distance to the road surface, the initial values of said estimated distance having been calculated under a condition that the vehicle is positioned parallel to the road surface;
means for comparing, for each of the plurality of the windows, the measured distance with the estimated distance to determine if the measured distance belongs to the road surface;
inclination estimation means for estimating a relative inclination of the road surface against the vehicle based on the measured distances that are determined to be of the road surface; and
means for modifying the estimated distances based on the inclination estimated by said inclination estimation means.

20. The system of claim 19 wherein said inclination estimation means comprises pitch estimating means for estimating slope of pitching of the vehicle as it travels and roll estimating means for estimating slope of roll of the vehicle as it travels.

21. The system of claim 20, further comprising:
distance estimating means for estimating the distance from each window to the road surface based on the slope of the pitch estimated by the pitch estimating means and the slope of the roll estimated by the roll estimating means; and
estimated distance memory for storing for each of the windows the distance estimated by said distance estimating means.

22. The system of claim 21 further comprising judging means for comparing the distance measured by said measuring means for each window and the estimated distance estimated by said distance estimating means to determine relative to each window represents the road surface; and recognition means for recognizing the object based on a result from the judging means.

23. The system of claim 22 wherein said judging means extracts windows that represent object other than the road surface for transfer to said recognition means.

24. The system of claim 19 wherein said pitch estimating means determines pitch angle $\emptyset$ according to the equation;

$$\tan\emptyset = \frac{n\Sigma ZiYi - \Sigma Zi\Sigma Yi}{n\Sigma Zi^2 - (\Sigma Zi)^2}$$

where $Yi$ and $Zi$ are y-axis and z-axis positions respectively of the i-th sample and n indicates the number of samples, y-axis being the direction of height of the vehicle and z-axis being the direction of travel of the vehicle.

25. The system of claim 19, wherein said roll estimating means determines roll angle or $\alpha$ according to the equation;

$$\tan\alpha = \frac{n\Sigma ZiYi - \Sigma Xi\Sigma Yi}{n\Sigma Xi^2 - (\Sigma Xi)^2}$$

where $Xi$ and $Yi$ are x-axis and y-axis positions respectively of the i-th sample and n indicates the number of samples, x-axis being the direction of breadth of the vehicle and y-axis being the direction of height of the vehicle.

26. An object recognition system mounted on a vehicle, comprising:
one or more sensors for capturing an image of an object;
measuring means for measuring a distance to the road surface for each of a plurality of windows dividing the image;
means for storing, for each of the plurality of the windows, estimated distance to the road surface, the initial values of said estimated distance having been calculated under a condition that the vehicle is positioned parallel to the road surface;
means for comparing, for each of the plurality of the windows, the measured distance with the estimated distance to determine if the measured distance belongs to the road surface;
inclination estimation means for estimating a relative inclination of the road surface against the vehicle based on the plurality of distances that are determined to be of the road surface; and
correction means for correcting positioning error of said one or more sensors based on a long time average of the estimated inclination.

27. The system of claim 26 wherein said inclination estimation means comprises:
pitch estimating means for estimating slope of pitching of the vehicle as it travels; and
roll estimating means for estimating slope of roll of the vehicle as it travels;
wherein said correction means comprises:
distance estimating means for estimating the distance from each window to the road surface based on the slope of pitch estimated by the pitch estimating means and the slope of roll estimated by the roll estimating means;
estimated distance memory for storing for each of the windows the distance estimated by said distance estimating means;

wherein data held by said distance memory is made to change at a large time constant such that secular change of positioning of said one or more sensors is corrected.

28. The system of claim 26 wherein said correction means comprises:
   pitch estimating means for estimating slope of pitching of the vehicle as it travels;
   roll estimating means for estimating slope of roll of the vehicle as it travels; and
   sensor position estimating means for estimating deviation of the position of said one or more sensors from their specified position based on the pitch estimated by said pitch estimating means and the roll estimated by said roll estimating means;
   wherein the deviation of the position of said one or more sensors is determined based on moving average of the estimated pitch and the estimated roll.

29. An object recognition method for recognizing an object in front of a vehicle, comprising steps of:
   capturing an image in front of the vehicle;
   measuring a distance to the road surface for each of a plurality of windows dividing the image and thereby obtaining a plurality of distances;
   storing, for each of the plurality of the windows, estimated distance to the road surface, the initial values of said estimated distance having been calculated under a condition that the vehicle is positioned parallel to the road surface;
   comparing, for each of the plurality of the windows, the measured distance with the estimated distance to determine if the measured distance belongs to the road surface;
   estimating a relative inclination of the road surface against the vehicle based on the measured distances that are determined to be of the road surface; and
   modifying the estimated distances based on the estimated relative inclination.

30. The method of claim 29, further comprising a step, performed between the steps of measuring and inclination estimation, of:
   extracting windows having captured the road surface from the plurality of windows, and wherein the step of inclination estimation estimates the inclination utilizing distances of the plurality of distances, the utilized distances corresponding to the extracted windows.

31. The method of claim 30, further comprising a step of:
   estimating distances to the road surface respectively for the plurality of windows based on the estimated inclination, wherein windows are extracted based on the estimated distances in the step of extraction.

32. The method of claim 29, further comprising the steps of:
   judging, for each of the plurality of windows, based on the estimated inclination, whether the object is an obstacle or the road surface and thereby giving a judgment result;
   recognizing the object based on the judgment result;
   obtaining, when the object has been judged as an obstacle in the judging step, a relative speed and a relative speed and a relative distance between the vehicle and the obstacle utilizing the image;
   sensing possible collision with the obstacle based on at least one of the relative speed and the relative distance; and
   performing collision avoidance action.

33. An object recognition system mounted on a vehicle, comprising:
   a camera for capturing an image of an object; and
   a controller configured to perform the functions of;
   dividing the image into a plurality of windows;
   measuring a distance to the road surface for each of the plurality of windows and thereby obtaining a plurality of distances;
   storing, for each of the plurality of the windows, estimated distance to the road surface, the initial values of said estimated distance having been calculated under a condition that the vehicle is positioned parallel to the road surface;
   comparing, for each of the plurality of the windows, the measured distance with the estimated distance to determine if the measured distance belongs to the road surface;
   estimating a relative inclination of the road surface against the vehicle based on the measured distances that are determined to be of the road surface; and
   modifying the estimated distances based on the estimated relative inclination.

34. The system of claim 33, wherein the controller further performs functions of:
   extracting windows having captured the road surface from the plurality of windows, and
   estimating the inclination utilizing distances of the plurality of distances, the utilized distance corresponding to the extracted windows.

35. The system of claim 34 wherein:
   the controller further performs functions of;
   estimating distances to the road surface respectively for the plurality of windows based on the estimated inclination; and
   storing the estimated distances in a memory; and
   wherein the function of extracting the windows is based on the estimated distances stored in the memory.

36. The system of claim 33, wherein the controller further performs function of:
   judging, for each of the plurality of windows, based on the estimated inclination, whether the object is an obstacle or the road surface and thereby obtaining a judgment result;
   recognizing the object based on the judgment result;
   calculating, when the object has been judged as an obstacle, a relative speed and a relative distance between the vehicle and the obstacle utilizing the image; and
   sensing possible collision with the obstacle based on at least one of the relative speed and the relative distance and performing a collision avoidance action.

* * * * *